June 5, 1934.  W. N. SQUIRES  1,961,602
PUMPING SYSTEM
Original Filed Dec. 31, 1928    8 Sheets-Sheet 3
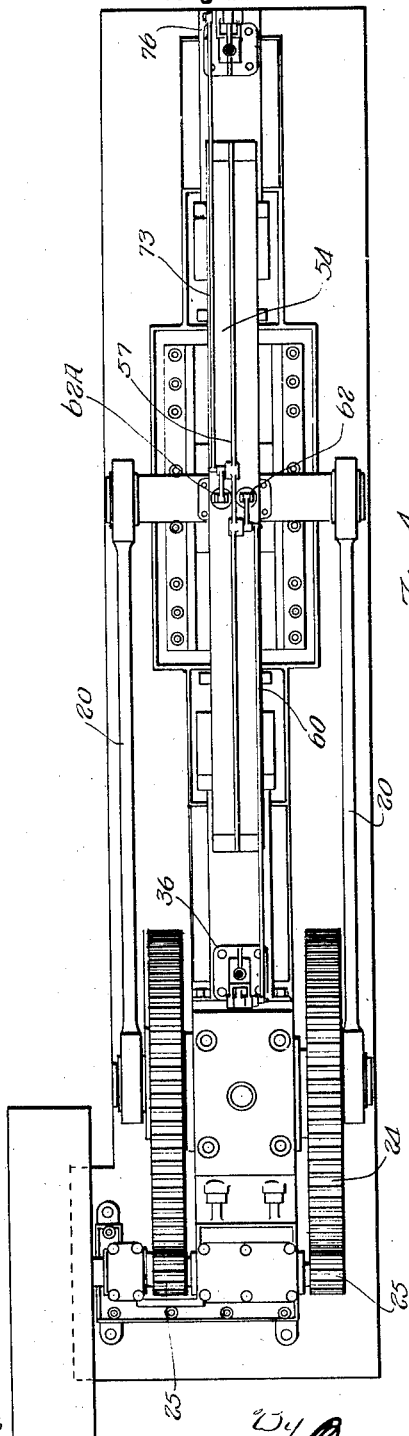
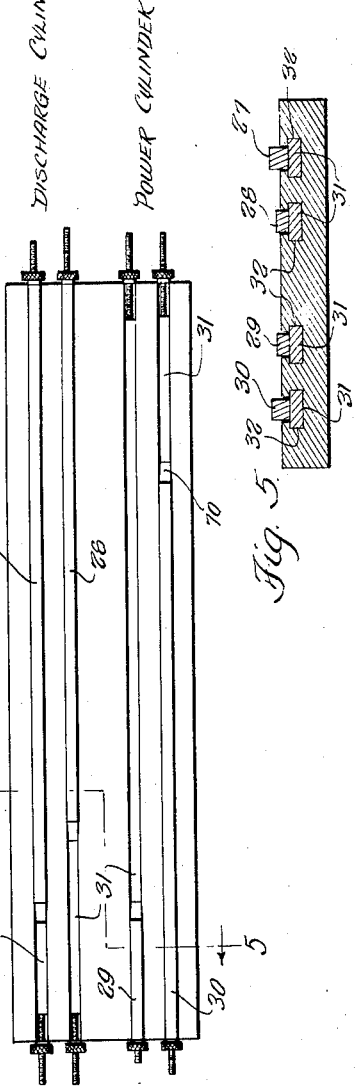
Inventor
Wilbur N. Squires June 5, 1934.  W. N. SQUIRES  1,961,602
PUMPING SYSTEM
Original Filed Dec. 31, 1928  8 Sheets-Sheet 4
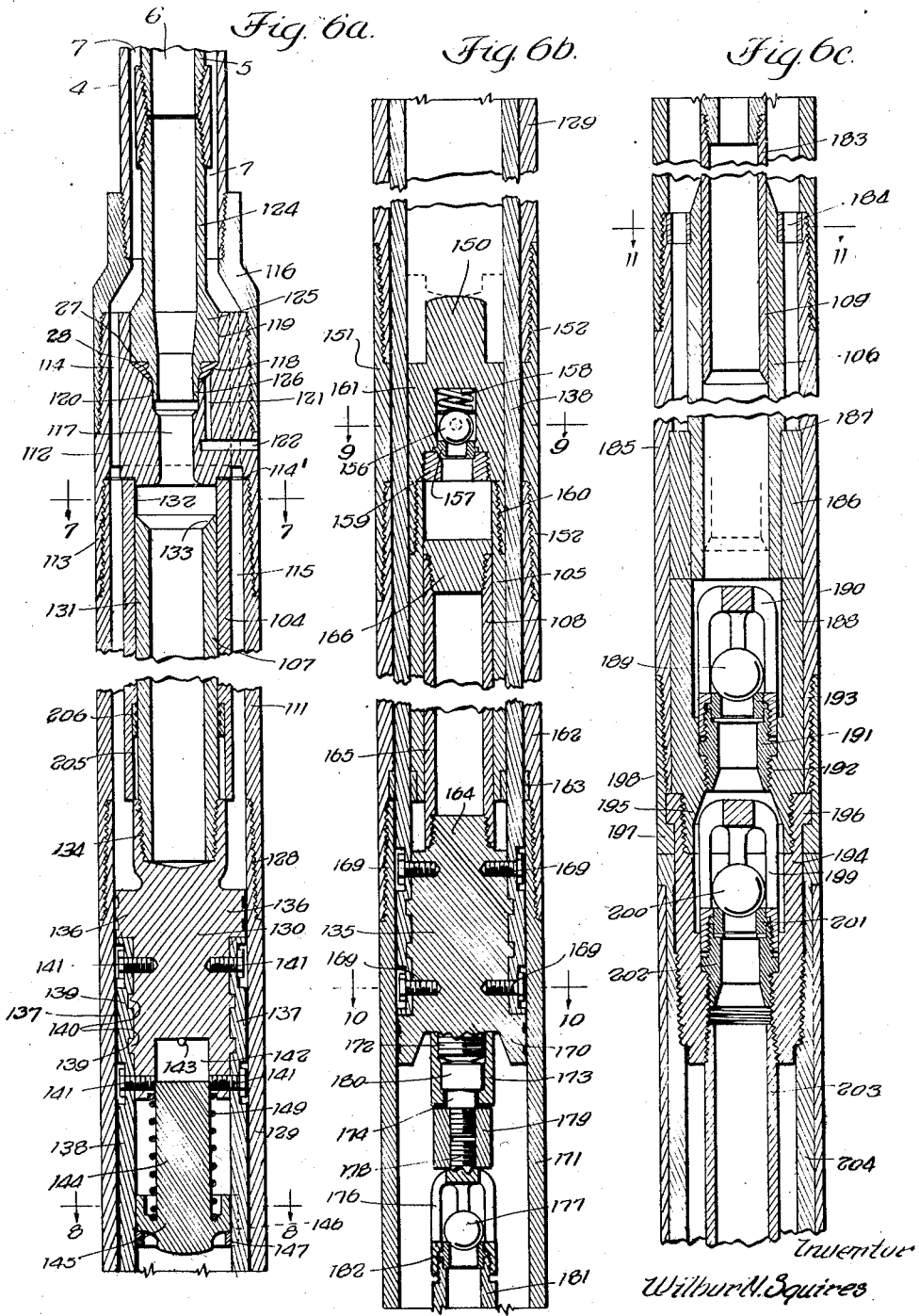

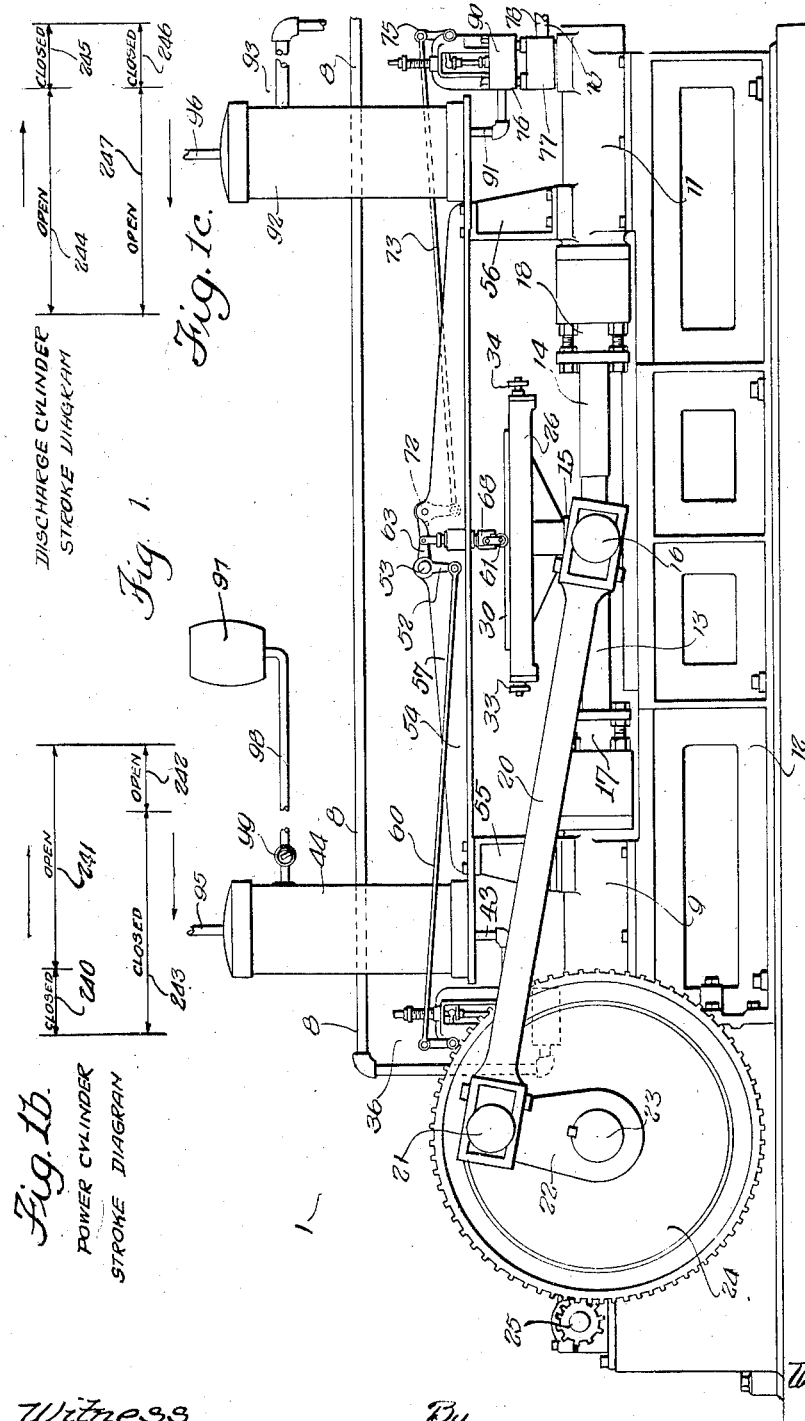

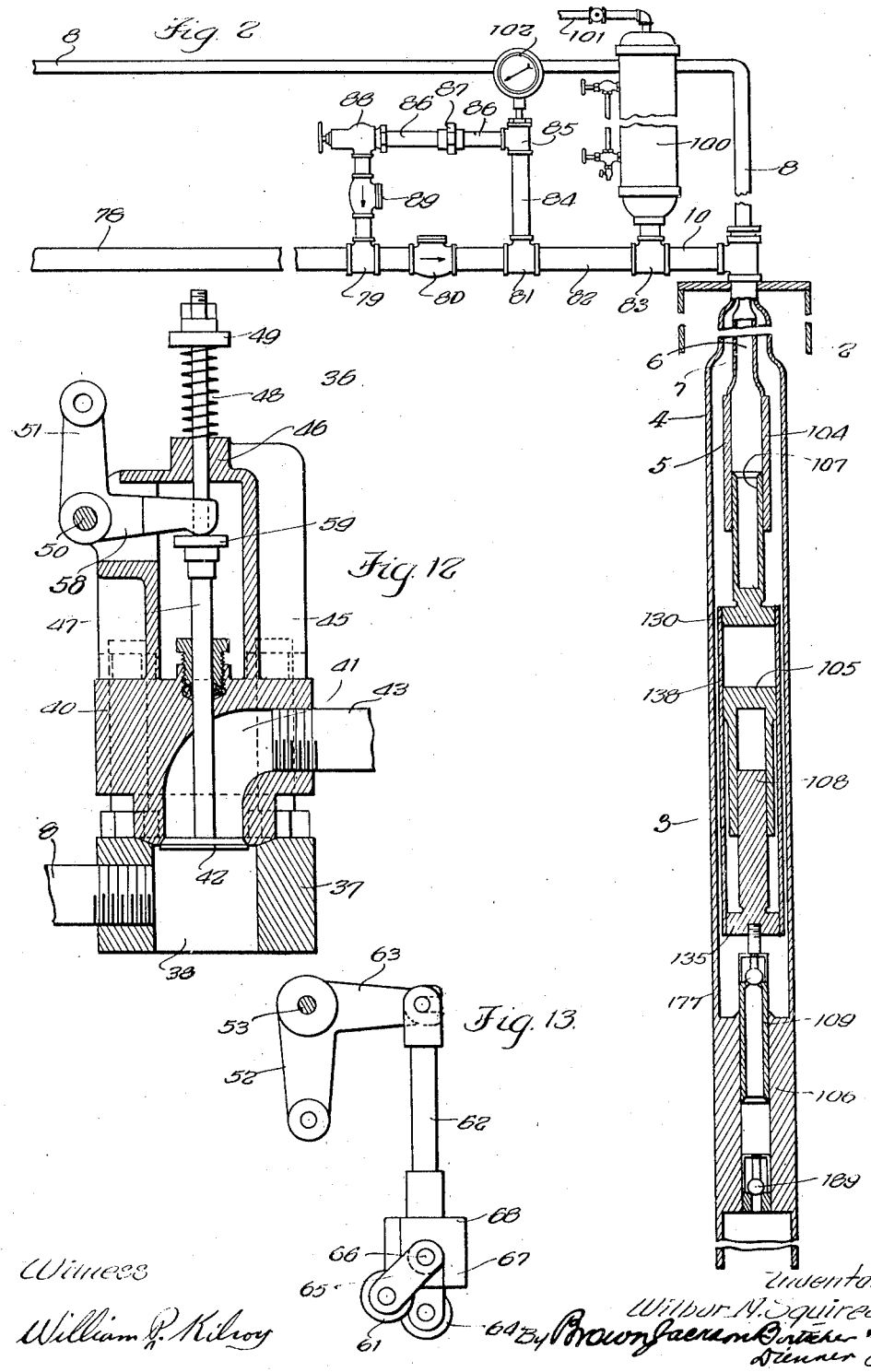

June 5, 1934.  W. N. SQUIRES  1,961,602
PUMPING SYSTEM
Original Filed Dec. 31, 1928   8 Sheets—Sheet 5

Inventor
Wilbur N. Squires

June 5, 1934. W. N. SQUIRES 1,961,602
PUMPING SYSTEM
Original Filed Dec. 31, 1928  8 Sheets-Sheet 6

June 5, 1934.  W. N. SQUIRES  1,961,602
PUMPING SYSTEM
Original Filed Dec. 31, 1928    8 Sheets-Sheet 7
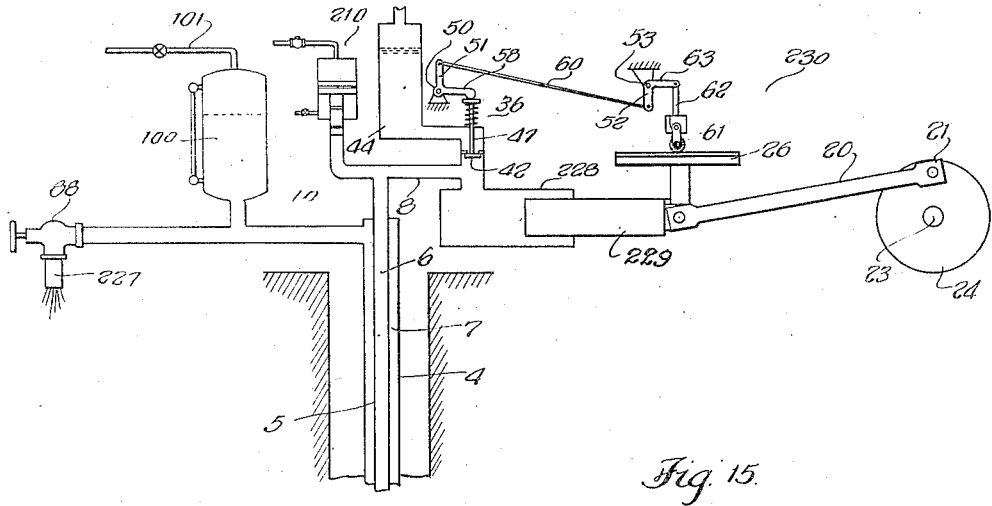
Fig. 15.
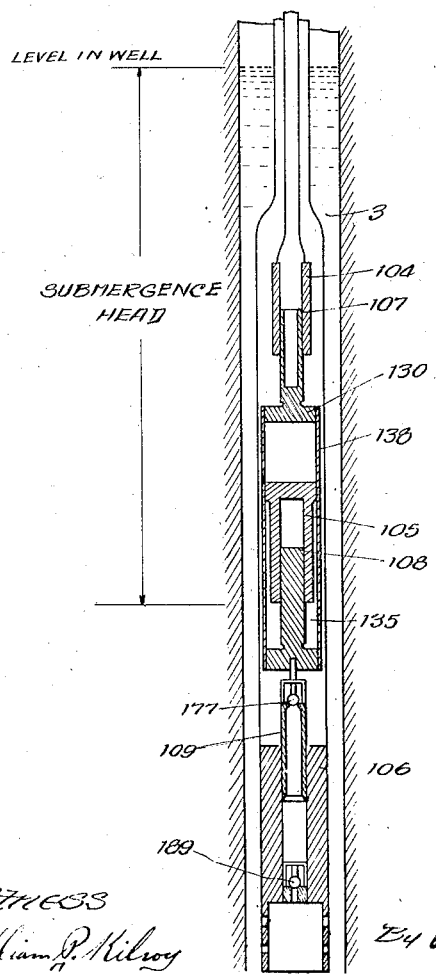

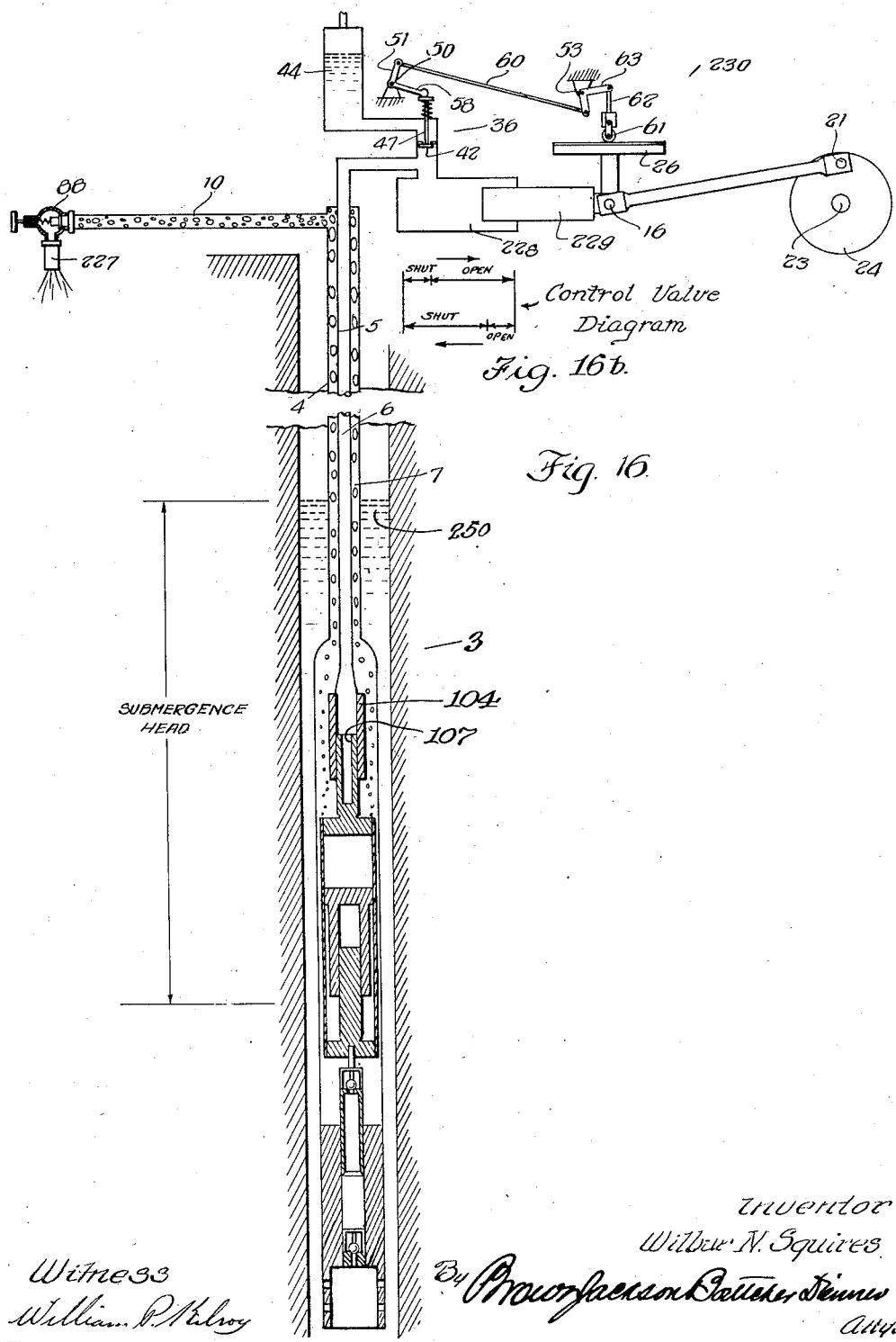

Patented June 5, 1934

1,961,602

UNITED STATES PATENT OFFICE 1,961,602

PUMPING SYSTEM

Wilbur N. Squires, Joplin, Mo., assignor to Hydraulic Deep Well Pump Company, Joplin, Mo., a corporation of Missouri Application December 31, 1928, Serial No. 329,591
Renewed October 17, 1932

53 Claims. (Cl. 103—46)

This invention relates to method of and means for pumping liquids from a well or other source of liquid at a great depth such as is encountered in pumping oil wells and the like. The present application represents improvements evolved from my prior copending applications, Serial No. 220,728, filed September 20th, 1927, now Patent No. 1,802,790, Apr. 28, 1931 and Serial No. 278,146 filed May 16, 1928.

In the operation of a deep well pump of the type disclosed in my aforesaid applications it was found that the inner column, which consisted of a body of liquid in a substantially closed space, rapidly became free of gas and became thereby a substantially inelastic fluid in which changes in pressure are transmitted at a very high rate throughout the extent of the column, whereas the outer column, which constitutes the discharge column consisting of liquid pumped from the well, retained always its character as a mixture of gas and liquid having a certain degree of elasticity because of its gas content, with the result that changes in pressure therein required an appreciable time to travel therethrough.

The difference in character of the power column and of the discharge column results, particularly where great depth is encountered, in a marked difference in operation of these two columns. The power column being substantially a solid fluid and incompressible, transmits pressure substantially instantaneously, whereas the discharge column being a semi-elastic fluid, prevents immediate transmission of pressure. This may be illustrated by the difference in sound propagation of the two media since sound is inherently a wave of pressure and rarefaction.

It was found that application of pressure to the power column resulted in immediate downward motion of the power piston of the deep well pump and consequent displacement by the same of liquid through the discharge column. However, the elasticity of the discharge column prevented a wave of displacement from reaching the head of the well until some time later. This characteristic of the discharge column calls for a different mode of operation of the pumping jack than would be the case if the two columns were of identical character. Since time is required for the wave of pressure to travel from the foot of the well to the head of the same suitable provision in the timing of the valves and operation of the jack is required.

Furthermore I have found that due to the elasticity of the discharge column and the natural frequency of the two columns in balance it is possible to utilize the back pressure of the discharge column in making the intake stroke of the pump and this can be done more effectively than if it were attempted to transmit a wave of pressure from the head of the well to the pump at the foot of the well. In other words, the elasticity of the discharge column prevents rapid transmission of pressure if it is applied. This means that time is consumed in permitting the impulse of pressure to travel from the foot to the head and likewise time would be required for a wave of counter-pressure to travel from the head to the foot if the system were operated as systems have heretofore been operated. This would mean that the rate of propagation of the pressure impulses would definitely control and limit the number of strokes which the pump could make because of the unavoidable time requirement for the traveling wave of pressure in one direction and then in the opposite direction. According to my present invention I have devised a method of operation and means suitable for carrying out the same which frees me of the restraint of time of the traveling wave by utilizing the elasticity of the discharge column itself and/or the submergence pressure to make the return stroke or intake stroke of the pump without the requirement to transmit pressure from the head of the well down through the discharge column. I find also that the submergence pressure is a force available at the pump to assist in making the intake stroke. To whatever extent the liquid in the well extends above the pump it affords a pressure useful in conjunction with the elastic pressure of the discharge column to make the intake stroke of the pump without application of pressure from the jack to the discharge column.

I believe it is broadly new in mechanism of this character to avoid the necessity of transmitting a wave of pressure down the full length of the discharge column in order to make the return stroke of the pump. I believe it is broadly new to make the return stroke of the pump by a force which is available at the foot of the column as distinguished from the force transmitted down the column. The forces to which I refer are the back pressure of the elastic column and the submergence pressure.

In a well of considerable depth and particularly where considerable gas is present there is another phenomenon which enters into the performance of the pump, and that is the expansion of the gas in the column as it approaches the head of the well. As the head of liquid upon the contained gas bubbles is decreased the gas bubbles expand in volume, and hence when a stroke of the pump is made the discharge column is advanced a considerable distance, and the head of liquid upon a considerable part of the gas content is suddenly released with consequent rapid expansion and violent discharge of the mixture of gas and liquid by the pump. When the liquid starts to flow out due to a discharge stroke of the pump it comes out with great violence, and that appears to be due to the fact that the top of the discharge column being raised tends to fizz off. In order to quiet the action of discharge and in order to employ the elasticity of the discharge column usefully in making the return stroke I have found it advisable to employ means for keeping the discharge column under a false head.

The preferred means is a spring loaded valve corresponding to a pop valve through which the liquid must discharge in coming from the discharge column. This spring loaded valve does two things. It serves as a flow restriction to keep the top of the column from discharging violently and too rapidly, and it serves also to retain or hold back a certain pressure on the head of the discharge column. I may in addition to the loaded valve employ a pressure trap which assists in quieting the discharge of the column and which also assists in retaining a false head upon the discharge column to assist in making the return stroke.

Now it is possible, due to the elasticity of the discharge column because of its gas content, to have a situation where the top of the column is violently blowing off the liquid raised by one stroke and at the same time the lower end of the column may be expanding in a direction to drive the pumping cylinder upwardly to make the intake stroke. This actually happens in the operation of my device. The pressure retaining valve together with the pressure trap permit of a false head being retained on the discharge column which may be only sufficient to equalize the difference in density of the two columns where ample submergence pressure is available for making the return stroke or may trap sufficient pressure upon the top of the discharge column to provide an operating pressure at the foot of the well to make the return stroke of the pump. By thus employing a force available at the foot of the well as distinguished from a force transmitted down through the discharge column I can now operate the pump by a single jack cylinder, and, what is more important, can increase the rate of making strokes of the pump over what could be accomplished if the pump were operated in accordance with the mode known in the prior art.

I have also found that because of the inertia of the columns in motion I can cause the pumping pistons to travel through a greater distance of useful stroke than would be accounted for by the displacement of the jack plungers. By increasing the length of the pump stroke to a value greater than the corresponding displacement of the jack plunger I can cause the columns to do useful work in damping out the inertia of motion.

In conjunction with the aforesaid mode of operation I have provided means on the control valves of the jack constituting an improvement on my aforesaid application No. 220,728, now Patent No. 1,802,790, April 28, 1931, whereby the effective strokes of the jack plungers may be varied to provide the necessary difference in timing between the power column stroke and the discharge column stroke so as to secure the most satisfactory mode of operation. While I employ a part of the stroke of the plunger for the discharge column, this is not essential, as I may employ only the power column plunger for operating the system.

In conjunction with the pressure trap, I employ a system of valves for retaining a predetermined pressure in said trap and for permitting inflow of liquid during a part or all of the stroke of the jack discharge cylinder for maintaining pressure in the pressure trap or otherwise assisting in making the suction stroke of the pump.

A further feature of novelty is the provision of volume chambers for one or both of the jack cylinders to insure immediate and complete filling of the jack cylinders at all times.

A further feature of novelty in the present invention is the new form of pump in the well. As now constructed, the pumping plunger and the static plunger are preferably of the same diameter, with the result that the static plunger balances out and equals the area of the pumping plunger so that the power plunger provides the only effective areas acted upon by the varying pressures in the two columns. The static and pumping plungers may be considered as a single pumping piston just as is the case in my copending application, Serial No. 159,896, filed January 8, 1927, now Patent No. 1,805,441, May 12, 1931.

The present form of pump, furthermore, provides a novel crosshead and connecting rod construction. Connecting rods concave in section and of relatively great rigidity are provided, and these may be secured by slitting a length of tubing; hence are inexpensive to manufacture. The relief valve for the static plunger is now disposed in the central part of the static cylinder so that sufficient room is provided for proper seating of this valve.

The moving piston system is provided with improved hydraulic cushions to cushion the limits of the stroke.

The drain section and its connections have been rearranged and improved.

Now in order to acquaint those skilled in the art with the manner of constructing and operating a system in accordance with my invention I shall describe in connection with the accompanying drawings a specific embodiment of the same.

In the drawings:

Fig. 1 is a side view of the jack and connections.

Fig. 1b is a stroke control diagram of the power piston.

Fig. 1c is a stroke control diagram of the discharge cylinder piston.

Fig. 2 is a diagram of piping from the jack shown in Fig. 1 to the pump in the well, which pump is shown diagrammatically in section. By laying Fig. 2 alongside of Fig. 1 a complete diagram of the system is presented.

Fig. 3 is a plan view of the jack with the volume tanks removed.

Fig. 4 is a plan view of the cam plate.

Fig. 5 is a cross sectional view of the same taken on the line 5—5 of Fig. 4.

Fig. 6a, Fig. 6b, and Fig. 6c, show, in three sections, a longitudinal section through the pump which is disposed in the well.

Figure 7:
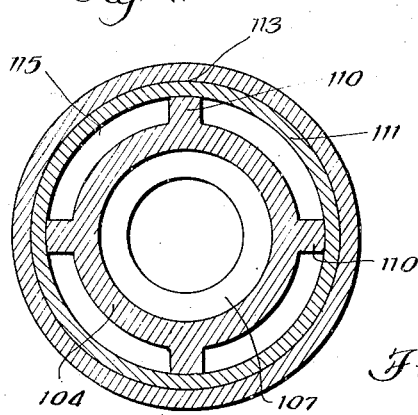

Fig. 7 is a section taken on the line 7—7 of Fig. 6a.

Figure 8:
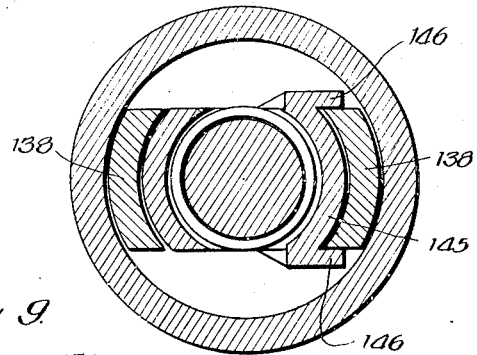

Fig. 8 is a section taken on the line 8—8 of Fig. 6a.

Figure 9:
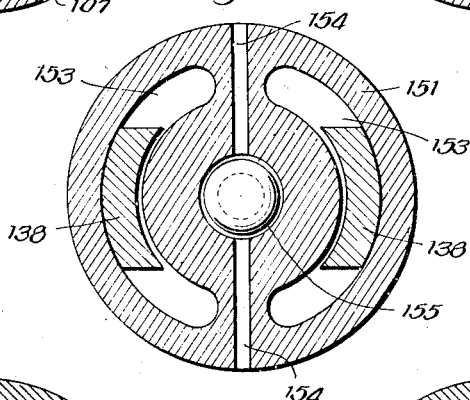
Figure 10:
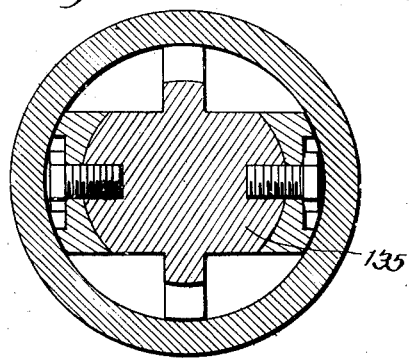

Fig. 9 is a section taken on the line 9—9 of Fig. 6b,

Fig. 10 is a section taken on the line 10—10 of Fig. 6b.

Figure 11:
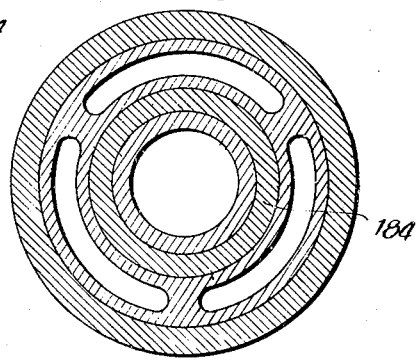

Fig. 11 is a section taken on the line 11—11 of Fig. 6c.

Fig. 12 is an enlarged view partly in section showing the construction of one of the stroke control valves of the jack.

Fig. 13 is an enlarged side view of the cam follower for engaging the cams shown in Figs. 4 and 5.

Figure 14:
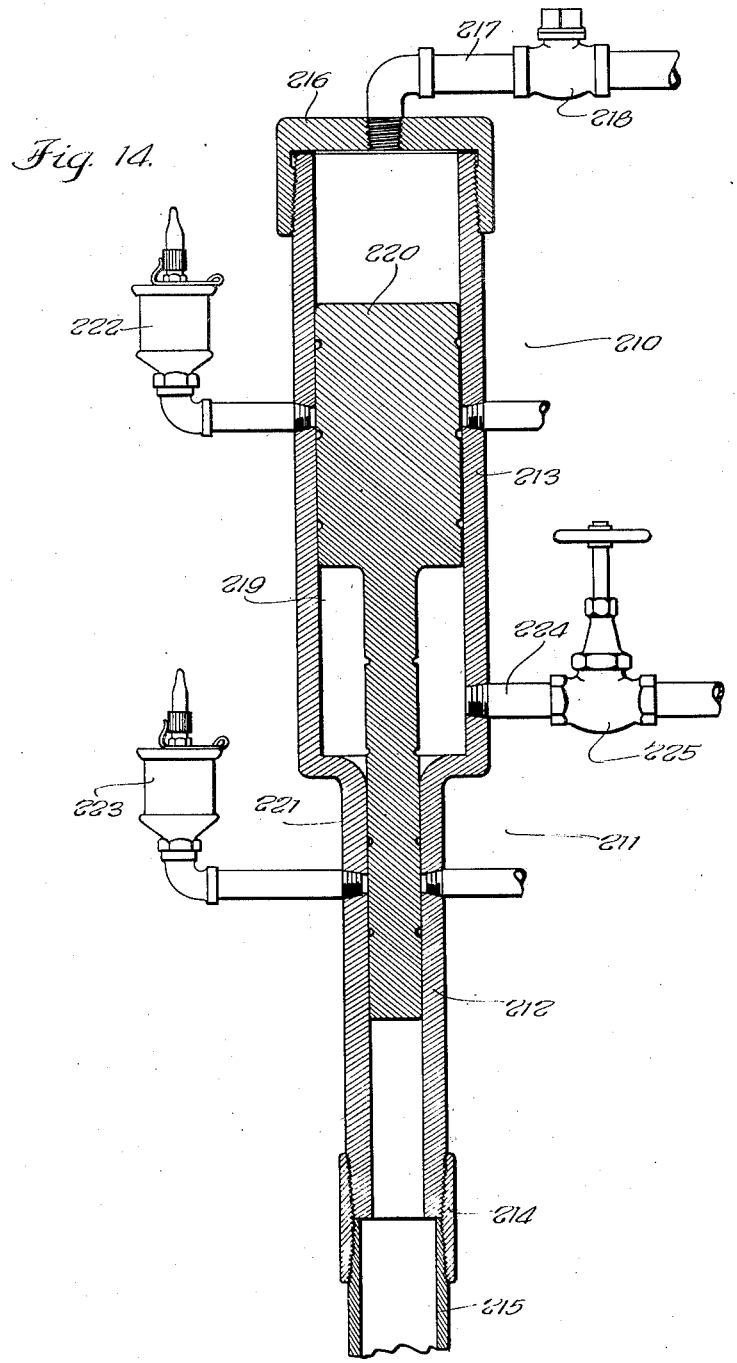

Fig. 14 is a section through the cushioning device for the power cylinder.

Fig. 15 is a diagram of a system employing a single cylinder jack.

Fig. 16 is a diagram of a similar system employing only the bare essentials of an operative device.

Fig. 16b is a stroke control diagram of the power piston.

Referring now to Fig. 1, the jack mechanism 1 is connected to the pump illustrated in detail in Figs. 6a, 6b, and 6c, and diagrammatically in Fig. 2, disposed in the well, the casing of which is indicated at 2. The pump 3 is not illustrated in Fig. 1, but it will be understood that the same is disposed within the well casing and in the liquid at the foot of the well, as shown in Fig. 2. By laying Fig. 2 alongside of Fig. 1, so that the pipes 8 and 78 of the two figures are in alinement, a complete diagram of the system is presented. The pump is connected to the jack 1 through a double string of pipe 4 and 5, the inner string 5 containing the liquid power column 6 and the space between the strings 4 and 5 constituting the discharge column 7. The power column 6 is connected through a pipe 8 (see Fig. 1) to the power cylinder 9 of the jack 1. The discharge column 7 is connected through a suitable pipe 10 and connections which will later be described, with the discharge cylinder 11 of the jack 1. The jack 1 comprises a bed or base frame 12 upon which are mounted the two jack cylinders 9 and 11 and suitable operating means for the corresponding plungers 13 and 14 which plungers are placed axially in line end to end and connected by a suitable crosshead 15 having wrist pins 16.

The cylinders 9 and 11 are provided with packing glands 17 and 18 maintaining a tight fit with the plungers 13 and 14. The plunger system is reciprocated by means of connecting rods 20 connected to crank pins 21 on the crank arms 22 of the shaft 23. This shaft is driven by suitable gears 24 and power pinions 25. Pinions 25 may be driven in any suitable manner. Preferably there is a dual connected rod drive, that is, one at each side so as to provide substantially a balanced thrust upon the plunger system. This is optional.

The cross head 15 bears a platen or table 26 upon which are supported cam strips 27, 28, 29 and 30 upon corresponding adjustable slides 31 disposed in grooves such as 32 in the plate or platen 26. The slides 31 are adjustable endwise through the medium of suitable threaded rods and lock nuts at each end, as indicated at 33 and 34 in Figs. 1 and 4. All of the slides 31 are so constructed in order to permit adjustment to be made of the cam strips 27, 28, 29 and 30. The outermost cam strips 27, 30 are slightly higher than the innermost strips 28 and 29 to permit of proper operation of the double roller system to be described later.

The power cylinder 9 has a suitable stroke controlling and gas releasing valve mechanism 36 shown in section in Fig. 12. This comprises a block 37 having a port 38 communicating with the interior of the cylinder 9. There is mounted upon the block 37 a valve chamber 40 having a passageway 41 therethrough, this passageway being controlled by a poppet valve 42 seating on a suitable seat in the valve housing 40. This valve is seated with pressure in the cylinder 9. Passageway 41 in the valve housing 40 communicates by way of pipe 43 with the volume tank 44, see Fig. 1. The valve housing 40 is provided with a suitable yoke or frame 45 providing at its upper end the guide 46 for the valve stem 47 of the valve 42. A compression spring 48 is confined between the collar 49 on the upper end of the stem 47 and the top of the guide 46 of yoke 45. This spring 48, therefore, tends at all times to bring the valve 42 onto its seat to close the same.

The yoke of frame 45 supports a rocking shaft 50 of a bell crank lever, one arm of which at 51 is connected to the arm 52 of the bell crank lever pivoted at 53 upon a web 57 of the frame member 54 disposed over the cam table 26. The yoke or frame 54 is connected through blocks or pedestals 55, 56 with the cylinders 9 and 11. The arm 58 connected to the rocking shaft 50 is forked at its outer end and is adapted to bear upon the collar 59 pinned on the valve stem 47. The arm 51 and the arm 52 are connected by pull rod 60 (see Fig. 1) so that the action of the cam strip 30 upon the roller 61 is transmitted through rod 62 to the bell crank lever arm 63, causing the arm 52 to pull upon the pull rod 60 and thereby actuate the bell crank and rock shaft 50 to open the valve 52, as will be described in detail later.

Roller 61 has a counterpart in roller 64 which is placed immediately back of the same and which holds push rod 62 up when it rides upon the cam strip 29 as said cam strip 29 moves toward the left during the early part of the power stroke. The roller 61 is supported in a swinging mount 65 which permits the roller to knuckle or swing about the pivot 66 in a clockwise direction, as viewed in Figs. 1 and 13. The roller and support are shown as swung to the left in Fig. 13. The portion 67 of the support 68 for the roller 61 bears against arm 65 to prevent the roller and its mount from knuckling to the right or escaping by counter-clockwise motion beyond the position shown in Fig. 1. In other words, the roller 61 and its swinging mount 65 will permit the same to knuckle if the roller 61 is pushed to the left, as viewed in Fig. 13, as when the cam table reverses its motion at the end of the stroke, but pressure upon the roller in the direction towards the right in Fig. 13 is resisted by the extension 67 of the block 68 so that the roller 61 and its mount 65 when it engages the rise 70 of the cam strip 30 thrusts the push rod 52 upwardly to actuate the lever arms 63 and 52 and thereby open the valve 42.

The roller 64 is mounted rigidly on the block 68 and does not knuckle. Now it may be seen, by reference to Figs. 1 and 4, that if the double roller 61—64 connected to the push rod 62 remains relatively stationary and the cam table starts to travel to the right, as viewed in Figs. 1 and 4, the rollers 61 and 64 are in alinement with the cam strips 30 and 29 respectively, when the roller 61 is encountered by the rise or lift 70 of the cam strip 30, both rollers and the connected push rod 62 will be raised opening the valve 42. Assume that the travel of the cam table 26 proceeds to the end of the stroke until the left end of the table arrives under the follower 62 and the travel of the table then starts in the opposite direction. Thereupon, immediately the roller 61 and its mount 65 will knuckle under and will tend to drop the push rod 62, but this is prevented by the roller 64 and its mount, which ride upon the cam strip 29 and hold the valve open until the roller 64 rides off the end of cam strip 29. While I have described the motion of the table with respect to the roller, it is to be understood that a reversal of parts might be made within my invention.

The frame member 54 has a central web 57, and a plunger 62A like the plunger 62 is mounted upon the opposite side of the web of the frame 54 in a suitable guide, and it acts upon a bell crank 72 connected by pull rod 73 with the bell crank 75 of the stroke control valve 76 for the discharge column cylinder 11.

The valve 76 for the cylinder 11 is constructed like the valve 36 for the cylinder 9, one description sufficing for both, the block 77 of the valve 76 being connected by a pipe 78 which continues through a T 79, check valve 80, T 81, pipe 82 and T 83 to the pipe 10 which connects with the outer string of pipe 4 defining the outer column or discharge column of the pump.

The check valve 80 opens to the right in the direction indicated by the arrow placed thereupon, that is, it permits liquid to pass from the cylinder 11 to the discharge column 7 but prevents return flow therethrough.

T's 79 and 81 provide connections for a bypass including the pipe 84, reducing T 85, pipe sections 86, union 87, adjustable spring loaded valve 88 and check valve 89, which check valve opens down in the direction indicated by the arrow to permit flow from the discharge column 7 towards the jack cylinder 11, but on application of pressure to pipe 78 by jack cylinder 11 it keeps pressure off the valve 88.

The valve housing 90 of valve 76 communicates by a short pipe connection 91 with the volume tank 92 having the outlet pipe 93 through which discharge of the pumped liquid is conducted to a suitable receptacle. The volume tanks 44 and 92 are preferably mounted upon pedestals formed on the blocks 55 and 56 so that these volume tanks are placed as closely as possible to the corresponding valves 36 and 76 of the corresponding cylinders 9 and 11 to insure that the cylinders 9 and 11 will always be filled with liquid.

The valve mechanism 76 is operated through follower plunger 62A by a pair of rollers like the rollers 61 and 64 facing, however, in the opposite direction and cooperating with the cam strips 27 and 28 in the same manner as the rollers 61 and 64 cooperate with the cam strips 30 and 29 respectively for the power cylinder. The cam strips are separable from the slides 31 so that different lengths of strips such as 27—28—29—30 may be provided for adjustment of the cam throws. Finer adjustment may be made by adjusting the slides 31.

It will be observed that the cam strips 30 and 29 are not symmetrically disposed with respect to each other. Neither are the strips 28 and 27 so disposed with respect to each other. That is to say, there is nothing symmetrical about the disposition of these cam strips, but as will appear later, the character of the columns requires an unsymmetrical disposition of the cam strips as above set forth. The stroke diagrams at the top of Fig. 1 show the positions of the corresponding valves during the corresponding piston strokes.

The volume tanks 44 and 92 are preferably provided with atmospheric vents as indicated at 95 and 96, although the atmospheric vent 96 may be omitted or modified in order to trap any gas which may be liberated in discharge volume tank 92. A suitable supply tank 97 is provided for replenishing the volume tank 44 through a suitable pipe 98 and valve 99. This tank 97 is preferably filled with salt water from the well such as may be taken from the pumped liquid. It is highly desirable that the working fluid in the power column be of a chemical composition which is not active with respect to the liquid in the well since, as will appear later, there may be a small leakage of liquid past the power piston within the pump, and any precipitation which would be formed thereby would be undesirable.

At the T 83 there is connected a pressure chamber or trap 100. This trap should have a capacity of air and liquid great enough to permit the introduction or escape of a stroke of liquid or such part thereof as may be desired to trap without too great a change in the air pressure which is contained in the upper part of the same. The pressure chamber 100 is provided with a compressed air connection 101 for charging the same with sufficient compressed air to permit the foregoing action to occur. The pressure gauge 102 connected to the T 85 indicates the pressure in the chamber 100. This chamber is preferably provided with a gauge glass to indicate the position of the liquid level.

The loaded valve 88 consists of a spring loaded check valve or the like opening in a direction towards the cylinder 11, that is, in the same direction as the check valve 89. The spring loaded valve 88 determines the pressure which is retained in the chamber 100. The loaded valve 88 acts to quiet the discharge of liquid from the discharge column when the pump makes a discharge stroke. It keeps a pressure upon the liquid and provides a relatively restricted flow which prevents violent discharge of liquid out of the pipe and particularly it breaks up slugging of the liquid as the bubbles of gas passing through the narrow opening between the valve and its seat quiet the discharge of liquid and gas. It also retains on the discharge column and in the chamber 100 a suitable pressure for balancing the pressures of the two columns on the motor piston 107 at the foot of the well.

The inner column 6 being free of gas will have greater density than the outer column 7, and hence there would be a tendency, depending upon the amount of gas in the outer column, to have a lack of balance in the wrong direction, that is, a preponderance of pressure downwardly. By the use of the pressure retaining valve not only is the discharge quieted but thereby a suitable adjustable false head is placed upon the discharge column, which will tend to bring about an equalization of pressure of the two columns on the motor piston 107 or may and preferably does retain a preponderance of pressure in an upward direction upon the motor piston 107. The functions of chamber 100 are relatively complex. Primarily the chamber 100 is useful in assisting the valve 88 to quiet the discharge, that is, to reduce the violence of liquid discharged from the column 7 to prevent slugging and to provide adjacent the valve 88 a capacity which will take up the violent fluctuations. It retains sufficient pressure on the discharge column to make or assist in making the suction stroke of the pump. It serves also as an expansion tank for the upward inertia of the discharge column, particularly under the condition where the valve 76 of the jack cylinder is closed. In addition, it serves as a cushioning means in case power is applied by the jack cylinder 11 to the discharge column. While the loaded valve 88 is so placed that all the escaping liquid must pass through it, the system of piping is such that liquid discharged by the jack cylinder 11 into the discharge column on making the suction stroke of the pump can pass freely through the check valve 80 as against whatever pressure prevails in the pressure chamber 100. The chamber preferably is kept at from 150 lbs. to 200 lbs. pressure, although this may be varied. The pressure which is to be carried in the chamber 100, that is, which is held back by valve 88, may be regulated in accordance with the gas content of the well to control the relative pressures of the two columns on the plunger 107.

The volume tanks 44 and 92 are placed immediately adjacent the valves 36 and 76 so as to permit filling of the jack cylinders immediately and without either the time lag or inertia effect of moving a long column of liquid. Thereby a more prompt and vigorous action of the jack can be obtained.

*Pump construction*

In Figs. 6a to 11 inclusive I have illustrated the preferred construction of the pump and connections for use in the above system. There are three main cylinders in the pump 3, namely, a power cylinder 104, differential cylinder 105 and a pumping cylinder 106. Corresponding with these there are plungers, namely, the power plunger 107, a static plunger 108 and a pumping plunger 109. These three plungers are all connected together in one movable system and operate as a unit. The power cylinder 104, which is shown in section in Fig. 7, is formed with longitudinal ribs 110 disposed within a length of seamless tubing 111. Cylinder 104 is preferably forced by press fit into the interior of the length of tubing 111. A coupling member 112 has threads as indicated at 113 cooperating with the threads on the upper end of the tubing section 111. A gasket 114' is interposed between the coupling member 112 and the tubing section 111. This coupling member 112 has a plurality of passageways 114 extending longitudinally thereof to communicate with passageways 115 which are formed between the cylinder 104 and the tubing 111.

The upper end of the coupling member 112 has external threads cooperating with the internal threads of a reducing coupling 116, the upper end of which is connected to the pipe string 4. Within the coupling member 112 there is a central passageway 117 communicating at its lower end with the interior of the cylinder 104. A tapered shoulder 118 is formed between the counterbore 119 and a smaller bore 120 which forms a part of the passageway 117. A plurality of drain passageways 121 communicating with radial drillings 122 at their lower ends extend into the seat or shoulder 118. At the lower end of the pipe string 5 there is a fitting 124 having an enlarged head 125 fitting in the counterbore 119 and guided into the bore 120 by an extension 126. A shoulder 127 is formed between the enlarged head 125 and the extension 126, and a gasket of relatively soft metal such, for example, as Babbitt metal 128, forms a seal between said head 125 and coupling member 112. Now it can be seen that by raising the inner string and pulling the head 125 out of the counterbore 119 the drain passageways 121 are opened to both columns 6 and 7 to permit draining of the same.

The lower end of the tubing 111 is internally threaded to receive the external threads 128 of the intermediate length of tubing 129 in which the crosshead member 130 is disposed. A plunger 131 fits closely the bore 132 of the cylinder 104. This plunger is made up of a piece of tubing having its upper end chamfered off as shown at 133 in order to scrape any solid particles from the walls of the cylinder 104 and cause the same to settle within the interior of the same.

At the lower end, the plunger 131 is threaded into a threaded socket 134 which is formed at the upper end of the crosshead member 130. The crosshead member 130 does not occupy the full cross section of the length of tubing 129 but, like the crosshead member 135 below it to which it is connected as will be seen in Fig. 10, ample space is provided for the passage of liquid past the crosshead. The crosshead 130 has guiding wings 136 at opposite ends of the diameter and immediately below these guiding portions 136 suitable seats are arranged for the upper ends 137, 137 of the connecting rods 138, 138. These connecting rods 138 are sections of seamless tubing cut on planes parallel to the axis so as to give a rod of considerable strength in bending which at the same time will fit admirably inside of the length of tubing 129. The upper ends of the rods 138 are grooved as indicated at 139, and there are corresponding lands or ridges 140 left on the crosshead 130 when the crosshead is machined so as to provide a connection which is sufficiently strong to withstand the thrust and pull of the crosshead with respect to the rods 138. The ends of the rods 138 are held in place by means of machine screws 141, the heads of which are set into the recesses in the upper ends of the rods and the shanks of which are threaded into the body of the crosshead 130. There are preferably two such machine screws for each end of the connecting rods 138, 138, and they are preferably provided with polygonal heads so as to be engageable by a socket wrench.

The crosshead 130 has a cushion cylinder 142 formed in the lower end of the same, and this cushion cylinder has an escape port 143 to govern the escape of liquid from the cylinder 142. A cooperating plunger 144 fits in the cylinder 142, the cylinder and plunger forming a shock absorber for taking up the shock of stopping the movable piston system on the downward stroke. The plunger 144 has a head member 145 by which the lower end of the plunger that is furthest from the cylinder 142 is guided between the connecting rods 138, 138. The head 145 has guiding wings 146, 146 shown in Fig. 6a extending along the sides of one of the connecting rods 138 in order to retain the head in predetermined guiding alinement with the rods 138, 138. It will be seen that the sides of the head are cut off substantially on the line of the edges of the rods 138, 138 and hence if the piston 144 and its head 145 should be permitted to rotate a quarter turn the head 145 would no longer be guided by the rods 138. The head 145 is stopped by engagement with a shoulder 147 which is formed by welding or otherwise attaching a metal strap or bar to the inside surfaces of the rods 138, 138. A compression spring 149 and the weight of the plunger 144 tend to move the plunger to the limit of its outward stroke with respect to the cylinder 142. The lower end of the head 145 is rounded and is adapted to engage a projection 150 forming a part of the intermediate section 151 which intermediate section is shown in Figs.

6b and 9. This intermediate section 151 may be made up as a forging or casting and provided with internal threaded sockets 152 at top and bottom respectively for cooperating with the intermediate tubing section 129 and the static cylinder tubing section 162.

The intermediate section 151 has longitudinal passageways 153, 153 extending therethrough to provide passageways for liquid in the outer column 7 and also to pass the connecting rods 138, 138 between the crossheads 130 and 135.

Vent passageways 154, 154 are formed by a diametrical drilling through the solid webs of the section 151 and these passageways 154 intersect an axial bore 155 in which the ball check valve 156 is caged. The check valve 156 seats upon a removable seat member 157 which is formed of a special metal to secure long life of this part. The ball 156 is seated normally by the compression spring 158, suitable space being available to permit proper disposition of the spring 158 and the ball check valve 157 because of the axial disposition of the same. The seat member 157 is held in place by a retaining ring 159 which is threaded into the body of the section 151. The section 151 also provides a threaded socket 160 into which is screwed the upper end of the static cylinder 105. The lower end of the cylinder 105 is held in alinement with the tubing section 162 by a spacing spider 163 which has passageways therethrough to provide spaces for the passage of liquid and also to pass the connecting rods 138, 138.

The crosshead 135 has a threaded stud 164 at its upper end upon which is threaded the plunger 165, this plunger preferably being formed of a length of seamless tubing suitably machined and ground to fit the interior of the static cylinder 105.

The upper end of the tube which forms the body of the plunger 108 is preferably closed as by the plug 166 threaded into the upper end of the sleeve 165.

The lower ends of the connecting rods 138, 138 are connected by the machine screws 169, 169 in the same manner as the connecting rods are connected to the upper crosshead 130. Likewise the connecting rods on the crosshead 135 are anchored together by grooves and ridges such as the grooves and ridges shown at 139 and 140 in Fig. 6a.

The lower end of the crosshead 135 is likewise provided with guiding wings 170 for guiding the crosshead on the inside of the tubing length 171 which is threaded into the lower threaded end of the tubing length 162.

At its lower end the crosshead 135 has a threaded boss 172 connected by threaded coupling 173 to the stem 174 of the pumping plunger 109. This pumping plunger 109 is a built-up structure comprising an open ball cage 176 for retaining the ball check valve 177. At its upper end the cage 176 has a stud 178 which is connected by a threaded coupling 179 to the threaded end of the stem 174 which stem 174 bears at its upper end and within the coupling member 173 a head 180. The lower end of the boss 172 and the upper end of the head 180 are preferably formed with opposed convex surfaces and the shank of the stem 174 fits loosely within the coupling member 173 so as to permit a slight flexibility of the coupling of the pumping plunger 109 with the crosshead 135.

The lower end of the ball cage 176 threads upon the upper end of a short sleeve member 181 holding thereupon the check valve seat 182 which is preferably made of a special metal to resist wear. A sleeve-like extension 183 formed of a piece of seamless tubing suitably machined and ground to fit the interior of the pumping cylinder 106 completes the pumping plunger 109. The pumping plunger thus has a bore for permitting the discharge of liquid from the pumping cylinder 106 upwardly past the check valve 177 into the space communicating with the discharge column 7.

The upper end of the pumping cylinder 106 is centered by spider member 184 (see Fig. 9) which spider member is a ring-like member seated between adjacent shoulders formed on the tubing lengths 171 and 185 where they are threaded together.

The lower end of the pumping cylinder 106 is reduced in diameter and pressed into a short, thick cylinder 186 which is gripped between a shoulder 187 formed on the interior of the tubing length 185 and the housing 188 of the ball check valve 189 which serves as an intake check valve. The ball 189 is retained by the cage 190, this cage being threaded upon a short nipple member 191 seated within the housing 188 as by means of the screw threads 192. The lower end of the cage 190 is threaded onto the upper end of the nipple 191 and retains the inlet check valve seat 193 in place. A second inlet valve housing 194 is threaded onto the lower end 195 of the first inlet valve housing 188. The housing 194 has at its upper end a narrow flange 196 which in turn is engaged by the inwardly extending flange 197 of the coupling sleeve 198 and thereby the two inlet valve housings 188 and 194 are held together and pressed against the lower end of the ring 186 which is shrunk or pressed upon the lower end of the pumping cylinder 106.

The valve housing 194 likewise contains a valve cage 199 having a check valve 200 seating upon a seat 201 held by the lower end of the cage and the upper end of the short threaded nipple 202 which is threaded into the bore of the housing 194. At its lower end the housing 194 has a suction pipe 203 threaded into the same. A suitable extension 204 is connected to the lower valve housing 194.

The space outside pumping cylinder 106 forms a sediment trap.

While I have shown two inlet check valves 189 and 200, I may dispense with one of them.

The moving piston system, including the power piston 107, static piston 108 and pumping piston 109 suitably connected together, is provided with a suitable hydraulic check or shock absorber for the end of the upward stroke. This comprises a counterbore 205 formed in the lower end of the power cylinder 104 with which counterbore cooperates the socket 134 forming a stepped piston for operating in said counterbore 205. A packing ring 206 in the upper end of the counterbore provides a relatively tight fit between the cylinder and the power plunger 107. An escape port may be provided but preferably this is sufficiently provided for by a relatively easy fit between the socket member 134 and the counterbore 205. If preferred, a hole may be drilled through the side wall of the counterbore and the extent of the checking action thus more definitely determined.

Now by reference to the diagram of Fig. 2 the mode of operation of the pump may be more readily understood. In a sample pump which I have heretofore constructed and operated, the diameter of the power piston was 2¾ inches and the diameter of the static piston and of the pumping piston was 2¼ inches.

The static piston and the pumping piston in effect form a single device and may be considered as a single plunger or piston. Obviously if under certain conditions a deviation from exact equality of areas is desired this may be accomplished by difference in size of the plungers 108 and 109.

The static piston and the pumping piston here shown present exactly the same area and in effect afford no areas subject to internal pressure for producing motion of these parts. In other words, the static piston balances out the pumping piston or plunger, and since the power cylinder is open at the upper end of the power column and at the lower end to the discharge column the pump as a whole is in substantially hydrostatic balance. Obviously, the system might deviate slightly from exact balance without appreciably affecting the operation of the same. Also the pump might be as disclosed in my copending application, Serial No. 220,728, above referred to namely, having a static piston of a larger diameter than the pumping plunger so that there would be a tendency at all times to raise the plunger system to the top of the stroke due to a preponderance of pressure upon the static piston, particularly where the discharge column has a high gas content. However, I find it highly advantageous to have the system in substantially hydrostatic balance since smoother working results under most conditions, and the plunger system may float, as it were, between the two hydrostatic columns. Preferably, I provide such a length of stroke in the cylinders as will permit movement of the plunger system by the inertia of the hydrostatic columns so that the inertia is usefully employed in pumping liquid. This reduces any tendency to pound and secures higher efficiency and greater displacement of the pump.

When pressure is applied to the power column 6 the preponderance of pressure in said column over the pressure in the discharge column 7 forces the piston system to descend.

The power piston 107 moving down in its cylinder 104 displaces the liquid which has been forced into the pump in order to move the piston 107 upwardly on the previous stroke. Downward motion of the static plunger 108 out of its cylinder 105 and entry of the pumping plunger 109 further into the pumping cylinder 106 displaces liquid from the inside of the pumping cylinder 106 into the space communicating with the discharge column, such liquid passing the discharge check valve 177. Thereby the discharge stroke is made and liquid is displaced by the device into the discharge column 7.

As soon as pressure is released on the power column 6, the elastic pressure retained in the discharge column preponders and tends to drive the movable plunger system upwardly to make a suction stroke by drawing liquid into the pumping cylinder. Any submergence pressure which exists within the well assists in this operation. The restriction which the liquid encounters as it enters the three inch string of pipe 4 tends to provide a slightly higher pressure within the shell or casing of the pump, and this is immediately available on the moving piston system to start the return stroke. The power which moves the pump pistons upwardly may be one of several things or a composite effect of various forces.

If the area of the static plunger 108 is greater than the area of the pumping plunger 109 and the columns are in hydrostatic balance, this difference in pressure may be employed for the upward stroke. Such arrangement is, however, undesirable, other things being equal, because a larger force is required by the jack plunger operating through the power column 6 to force such a larger static plunger downwardly. Such increase in area of the static plunger results in increased displacement of liquid upwardly and outwardly, with the result that there is a larger amount of liquid ineffectively moved or idled if such difference in areas is relied upon to produce the upward force. The discharge column may be kept under a preponderant static head by the false head retained through the valve 88. This requires a slightly larger force on the power column 6 when the down stroke is made.

If the columns and pistons are in hydrostatic balance and sufficient submergence pressure is available, the operation of the pump requires the least power. The submergence pressure working against a condition of vacuum or reduced pressure in the static cylinder 105 is the most desirable arrangement for making the return stroke.

Now the coordination between the pumping jack and the pumping device in the well is highly important. First, it is to be noted that the liquid in the power column is quickly freed of gas and becomes substantially as rigid as a steel rod whereas the liquid in the discharge column generally remains semi-elastic because of the contained gas which frees itself from liquid as the liquid approaches the surface where the pressure is released upon the same. The result is there is a decided difference in action between the two columns, and this in my earlier work had created much difficulty in securing a regular progression of operation of the jack and pump.

In addition, the steel containing walls of the outer column spring to a greater extent than the walls of the inner column, first because of the difference in diameter and next because of relative location. Preferably the inner column or string or pipe is of 1½ inches inside diameter for a pump 4½ inches inside diameter, and the outer column is preferably 3 inches inside diameter under the same conditions. The pipe for the inner column is disposed between the two columns and, therefore, the static pressures do not affect the same, whereas the full static pressure is applied to the outside pipe and it is of larger diameter. The outer column, therefore, in addition to being more elastic as to its contents is also more elastic as to its container. This is to be taken into account in coordinating the jack with the pump. The pipe of the outer column may have thinner walls than the inside, as it is not subjected to high working pressures.

In operation, the jack is preferably driven at a speed which will produce the maximum efficiency. This naturally varies for the depth of the well, the character of the liquid and the like. Assume that the parts are in the position shown in Figs. 1 and 2 and that the jack plungers 13 and 14 are moved to the left. Liquid is driven out of the cylinder 9 and as the control valve 36 is closed this liquid will be driven down the power column 6 and will cause the moving plunger system to begin the discharge stroke. Such discharge stroke tends to force liquid up the discharge column and the liquid arriving at the head of the well some time after the beginning of the discharge stroke will increase the pressure in the pressure chamber 100 and pass partly into the same and partly through the pipes 82, 84, 86 past the loaded valve 88 and out the pipe 78 and into the discharge cylinder 11 but also past the control valve 76 which is now open due to the cam rollers riding upon the tracks 27 and 28 and holding said valve open.

The liquid, therefore, passes into the discharge volume tank 92 and out the discharge pipe 93 into the receptacle for pumped liquid. Meanwhile the direction of the motion of the plungers 13 and 14 reverses and the valve 36 remains closed for a short distance represented by the cam track 29 on Fig. 4 and represented by the part 240 of stroke diagram in Fig. 1b, the valve remaining closed for this short distance in order to let down the pressure which remains on the power column due to its compressibility and the strain of the containing walls. It is not advisable to release the pressure on the power column immediately at the end of the stroke since said column is under a high pressure due to its compressibility, the stretch of the containing walls and the pressure of the outer column upon the pipe 5, and the opening of the valve 36 would result in a violent discharge of some of the liquid. By keeping the valve 36 of the power cylinder closed until the compressibility of the power column is spent the liquid of the power column is allowed to expand in the jack cylinder 9 and does not need to pass the valve 36 into the volume tank and back again.

As soon as this pressure has been let down the roller 61 rides up the incline 70 of the cam track 30, opening the control valve 36 and permitting the passage of liquid into or out of the cylinder 9. This corresponds to line 241 on the stroke diagram. If due to any leakage, a deficiency of liquid exists, some will flow in from the volume tank 44 to keep the cylinder filled at all times. At the end of the stroke of the plunger 13 outwardly or to the right, as viewed in Fig. 1, the motion of the plunger 13 is reversed and thereupon the cam follower 61 knuckles under on its mount 65 and the cam follower 64 rides on the track 29 keeping valve 36 open for the short distance indicated by line 242 until it also drops off of the inclined portion 70, the valve 36 then being closed at what is the beginning of the effective stroke of the plunger 13 to the left, which is indicated by line 243 on the power cylinder stroke diagram.

The plunger 13 then continues its stroke as above described to the limit of its motion and starts back before the valve is opened by the cam follower 61 riding upon the inclined space 70 of the track 30.

Meanwhile consider the plunger 14 on the discharge line. As previously stated, the arrival of the plunger 13 to the limit of its stroke to the left corresponds to substantially complete discharge, but there may be some flow after the piston 13 has completed its pumping stroke. This discharge will continue for some time after the plunger 14 begins to move to the right, and obviously the control valve 76 must remain open during such part of the stroke in order to let the liquid escape from the discharge column due to the delay of the pressure wave traveling up said column. By reference to the cam tracks 28 and 27 and the stroke diagram of Fig. 1c it can be seen that the control valve 76 remains open as indicated by line 244 on the stroke diagram until the plunger 14 has reached a point near the end of its outward stroke, that is, to the right as viewed in Fig. 1, whereupon the inner cam follower roller will drop off the track 28 and close the valve and complete the stroke with closed valve as indicated by line 245. However, in the meantime the discharge of liquid has substantially stopped and the preponderance of pressure in the outer column, particularly due to the trapping of pressure in the pressure tank 100, has begun to move the pumping plunger in the well on the reverse or suction stroke.

As the plunger 14 approaches the end of its stroke to the right, pressure will tend to deplete in the pressure tank 100 except as the same may be made large enough to account for the same, and I may deem it desirable at this time to close the control valve 76 and cause the plunger 14 to drive liquid past the check valve 80 into the pressure trap 100 to restore the pressure of the same as indicated by line 245 on the diagram.

The plunger 14 having completed its pressure stroke then begins to move to the left as the power plunger 13 begins its pressure stroke. The valve 76 is allowed to remain closed for a short distance as indicated by line 246 on the stroke diagram before it rides up on the cam track 27. Then the valve is opened, permitting pressure to be released in the piping and connections so that the action proceeds without a jar or water hammer. This part of the stroke is indicated by line 247 on the diagram. Discharge begins during the latter part of this stroke.

As previously explained, if the capacity of the pressure tank 100 is great enough or if the elasticity of the column is great enough, the control valve 76 might remain open at all times, and in fact the cylinder 11 might then not be required. I have thus operated the system. However, it is desirable, particularly for starting the pump into operation, to be able to apply pressure on the discharge column to assist in quickly charging the pressure tank 100 and also, as above explained, to supply a small amount of displacement towards the end of the stroke of the pump mechanism on the return or discharge stroke to keep up the pressure within the discharge column and pressure tank 100.

In connection with the operation of the power cylinder 9 it will be observed that there is no elasticity in this cylinder and its connections, and I, therefore, provide a means for avoiding the effect of water hammer by the cushioning device shown in Fig. 14.

The cushioning device 210 comprises a differential cylinder 211 consisting of the lower cylinder member 212 which may, for example, be of 1½ inch internal diameter and the upper cylinder member 213 which may be, for example, of 4 inches internal diameter. The two cylinders 212 and 213 are in communication with each other, and the lower end of the lower cylinder 212 is connected by a pipe coupling 214 to a pipe 215 which is in communication with the power jack cylinder 9 at all times. The upper end of the upper cylinder 213 is closed as by a cylinder head or cap 216, this cap being connected to a pipe 217 through a check valve 218. The pipe 217 leads to atmosphere or it may lead to a source of compressed air, the check valve 218 preventing outflow of air from the cylinder. A stepped piston 219 comprises an upper piston member 220 and a lower piston member 221, these pistons being connected together preferably integrally. The pistons are carefully fitted to the cylinders to make tight joints and the pistons are provided with oiling rings, and suitable oilers such as 222 and 223 are provided for maintaining the pistons properly lubricated.

A relief passageway in the shape of a pipe 224 is connected through the wall of the upper cylinder member 213 a short distance above the bottom of the same. The valve 225 is connected in said pipe 224. This valve may be opened to permit of the discharge of any leakage of liquid past the lower piston 221.

The operation of the device is as follows: When the jack plunger 13 begins its power stroke there is a tendency to cause shock due to the sudden application of pressure to the stationary column. This is particularly pronounced if the column still has inertia of movement upwardly.

Such shock is relieved, however, by liquid flowing into the hydraulic end of the lower cylinder 212 and driving the stepped piston 219 upwardly. This upward motion may be relatively rapid at first, but is soon checked by the air trapped above the larger piston 220 in the upper end of the cylinder 213.

Upon reversal of motion of the power jack plunger 13, the pressure drops and when the control valve 36 is opened, pressure in the pipe 215 is less than sufficient to maintain the stepped piston in its upper position and it tends to fall, due both to its weight and to the pressure of the air on the upper piston 220. Upon its downward motion, the stepped piston is cushioned by trapping air below the pipe 224. The valve 225 is normally open but, if desired, it may be closed with a charge of air trapped between the stepped pistons of such an amount as will produce the desired cushioning effect on the downward stroke.

If desired, pressure above atmosphere may be applied to the upper end of the cylinder 220 through the pipe 217, but I have found atmospheric pressure to be sufficient to secure the desired rapid upward motion of the stepped piston with gradual checking of the motion of the same to be entirely satisfactory. It will be seen that this device permits of sufficient rapid outflow of liquid from the jack cylinder upon the beginning of the application of pressure by the power plunger to relieve the shock, this outflow being checked, however, with increasing rapidity, as the stepped piston is forced upwardly. By this means, a smooth operation of the application of pressure to the power line is secured.

In Fig. 15, I have shown a diagram of a system of my invention in which only a single jack cylinder 228 and plunger 229 are employed for applying pressure to the power column 6. This jack 230 may be considered as part of the double jack mechanism shown in Fig. 1, employing the power cylinder 9 of said jack shown in Fig. 1. The cam table 26, in this case, has a pair of cam tracks for rollers, such as 61 and 64. The cam tracks 29 and 30, shown in Fig. 4, being arranged substantially as shown in said figure for operation in connection with the device shown in Fig. 14. The operation of this system is as follows:

Assume that the plunger 229 is being driven inwardly, that is, to the left, as viewed in Fig. 15, the valve 42, at this time being closed. Liquid is forced from the cylinder 228 down the power column 6 driving the movable plunger system of the pump 3 downwardly to make the discharge stroke. Downward motion of the plunger system discharges liquid from the pumping cylinder 106 into the discharge column past the discharge check valve 177. Such discharge of liquid creates a pressure in the semi-elastic discharge column and the wave of pressure travels upwardly in the discharge column 7, arriving at the head of the well, and liquid tends to flow into the pressure chamber 100 until the pressure exceeds the value for which the spring loaded check valve has been set, whereupon liquid is discharged at the delivery pipe 227.

Due to the elasticity of the inner pipe strings and connections, pressure in the jack cylinder 228 does not drop immediately when the plunger starts on the return stroke. Neither is the inertia of motion of the inner column 6 immediately stopped. Therefore, the valve 36 is allowed to remain closed during a part of the return stroke of the plunger 229, the inertia of the inner and outer columns carrying the movable piston system of the pump 3 to complete the end of the stroke. As soon as the pressure in the pumping cylinder 228 has dropped to the desired value where no violent outflow occurs, the control valve 36 is opened and, if the inertia of the inner column requires further liquid to flow into the same, this is accomplished by the open communication with the volume tank 44. When the moving piston system has reached the end of its stroke, it should immediately be reversed and this is accomplished by the pressure retained on the discharge column, the valve 36 still remaining open. The pressure in the discharge column quickly drops to a value where the check valve 88 closes and the retained pressure makes the return stroke of the pumping pistons to draw a charge of liquid into the pumping cylinder 106 through the intake check valve 189. To whatever extent submergence pressure is present, it assists in making the upward or filling stroke. This stroke is made as rapidly as possible and may still be proceeding when the plunger 229 reverses its motion. The valve 36, however, remains open for a short distance after the reversal of the stroke, as may be seen by reference to Fig. 1b, so that liquid may flow out of the cylinder 228 without being forced into the hydraulic column 6, which is still rising. The stroke diagram for plunger 229 is the same as that shown in Fig. 1b.

I wish to point out that during normal operation, the static cylinder will be substantially evacuated. Hence, the submergence pressure, as indicated in Fig. 15, will be effective on the bottom surface of connected pistons 108—109 to drive the parts upwardly by whatever difference in pressure may exist in the well, as against the pressure in the cylinder 105. The pressure in the cylinder is below atmospheric and the partial vacuum assists in the action. If any fluid should leak into cylinder 105, it is expelled by the inertia effect of the moving pistons and columns striking the same at the end of the upward stroke. Submergence pressure is, therefore, useful in this form of pump. This would not be true if there were open communication between the well and the top of piston 108.

When the hydraulic column 6 has been brought substantially to rest, the valve 36 is closed and the beginning of the effective power stroke occurs. This is cushioned by the cushioning device 210 previously described and thereafter the downward motion on the column 6 and the pumping mechanism begins. The operation is thus successively repeated.

In starting up the pump, where a single jack cylinder is employed, air pressure is first applied to the pressure chamber 100 as by means of the pipe 101 to provide a suitable operating head upon the discharge column 7. The cam tracks are adjusted to the desired position and, in a few strokes of the jack the proper adjustment may be attained and the system started into operation.

While I speak herein of the pump being balanced hydrostatically because of equal areas, it is to be understood that a slight deviation from the same is permissible within the invention, and it is also to be understood that where the length of the pump is great enough to make an appreciable difference in the hydrostatic head upon the different parts thereof, the difference in diameter may be made so as to compensate for the different heads under which the parts operate. The motor system 107 is in substantial hydrostatic balance between the columns. The pumping plunger 109 is exposed on the inside to the discharge column and on the outside it may be considered as exposed to the pressure of the well, and likewise the static piston 108 on the inside is exposed to the pressure of the discharge column and on the outside is exposed to the static pressure of the well so far as driving any fluid out of the cylinder 105 is concerned. Therefore, the system as a whole is in substantially hydrostatic balance.

In Fig. 16 I have shown in diagram the essentials of a system embodying my invention, this diagram particularly illustrating the action of the gases contained in the outer column. It is not essential that the pressure trap 100 be employed since the volume of the connected parts and the elasticity of the power column 7 together with the gas contained therein is great enough to provide the force for returning the piston system in the pump. The single jack cylinder 228 shown in Fig. 16 has a plunger 229 operated through the connecting rod 20, crank pin 21 and gear 24.

The plunger has connected thereto the cam table 26 which is provided with a pair of cam strips such as 29 and 30 shown in Figs. 4 and 5. It has the two cam rollers such as 61 and 64 shown in Fig. 13 cooperating with the cam strips to move the plunger or roller 62 up and down and acting through the bell cranks such as 63 and 51 to control the opening and closing of the stroke control valve 36. Below the cylinder 228 I have shown the control valve diagram, Fig. 16b, showing the position of the valve for different positions of the plunger 229 throughout its cycle. The jack cylinder 228 is connected to the inner string of pipe 5 which contains the power column 6, this power column at its lower end being connected to the power cylinder 104 for driving the power plunger 107 downwardly to make a discharge stroke of the pump. The pump 3 is disposed in the liquid in the well which stands at a height indicated at the level 250 providing a suitable submergent head which in the present instance is great enough to make the upward stroke of the moving system of the pump. The liquid in the well contains gas which is evolved by the action of pumping. It is well known that oil in the crude state contains absorbed gases and contains constituents which tend to evolve as fixed gases and vapors that are difficult to condense. These gases entering the pump with the liquid tend to become free by the agitation and release of pressure which they may encounter during the flow, and the tendency of these gases is to expand as they approach the head of the well. I have indicated the gas bubbles as increasing in size as they approach the head of the well in Fig. 16.

As the pump 3 makes a discharge stroke there is an upward drift or movement of the outer column 7 with consequent release of the hydrostatic head upon a particle of gas, and such particle tends to expand. Hence, when a stroke is made it takes an appreciable time for the wave of pressure, that is, compression to move up the column 7 because of its elasticity and compressibility, but when the upward motion arrives at the head of the well there is a tendency for violent discharge to occur. The valve 88 serves to smooth this out. The expansion and discharge of liquid at the head of the column 7 may be proceeding and continuing after the pump 3 has completed its discharge stroke. The jack plunger 229 starts on the reverse motion out of the cylinder 228 first letting down the pressure without opening the valve 36, then opening the valve. The retreat of the jack plunger 229 permits the submergence pressure, assuming the two columns to be of the same effective pressure at the foot of the well, to move the plunger system upwardly on the filling or intake stroke. As the plunger system moves upwardly it would appear to be necessary that the outer column 7 move downwardly, but for the same reason that a discharge stroke is not felt immediately at the head of the well an intake stroke is not felt immediately at the head of the well. The upper end of the column 7 may continue to discharge liquid and the lower end of the column may begin the return stroke. These two actions may proceed simultaneously. It is not necessary, therefore, to reverse the column 7 in order to make the return stroke.

The restriction to flow which exists between the strings of pipe 4 and 5 would appear to be detrimental, but such is not altogether the case. In fact it presents desirable features for steadying the upward flow and for permitting the lower end of the column to make the return stroke independently without the necessity for dropping the entire discharge column 7.

The valve action of the jack shown in Fig. 16 is like that of the left hand end of the jack shown in Fig. 1 and need not be further described, as the description given in connection with Fig. 1 will suffice for Fig. 16.

In each of the systems shown herein, that is, the systems of Figs. 1 and 2, of Fig. 15, and of Fig. 16, the delivery of the pump may be correlated with the production of the well by suitable adjustment of the stroke control valves. For example, in the system of Figs. 1 and 2, if the well produces oil at a rate less than that which would be pumped by the jack 1 operating at full capacity, that is, full length of stroke, the delivery of the pump may be reduced, without changing the speed of the jack since that is substantially fixed by the motor speed, by shortening the stroke of the pump 3. This may be done by adjustment of the cam strips, such as 27, 28, 29 and 30, to reduce the effective stroke of the jack by allowing escape of the liquid for a longer part of the time occupied by the stroke. Thus, for example, in Fig. 1 the cam strips 29 and 30 (see Fig. 4) may be adjusted or changed to increase the length of the open portion indicated by line 242 on the diagram of Fig. 1.

The cam strips 27 and 28 may likewise be changed if desired, but since the major function of the cylinder 11 is to steady the discharge and restore pressure in the pressure trap 100, the change of the cam strips 27 and 28 need not be as great, or may be omitted entirely. Likewise on cam strip 29 the closed part indicated by line 240 is merely to allow the compression of the power column to be eased off and this will be substantially constant regardless of the length of the power stroke.

In the system of Fig. 15, the cam strips 29 and 30 may likewise be adjusted to control the effective displacement of the plunger 229 by permitting escape of liquid at the valve 36 for a large part of the stroke when it is desired to decrease the effective length of the stroke of the pump 3.

In the system of Fig. 16, the same stroke control may be exercised to correlate the delivery of the pump to the production of the well.

In each of the systems illustrated, effective displacement of the power plunger in forcing liquid down the power line 6 controls the effective length of the stroke of the pump 3, and consequently its displacement per stroke. This is true because the forces producing the return stroke are substantially independent, or may be substantially independent, of the effective displacement of the cylinder 11 in the system of Figs. 1 and 2.

Likewise in the systems of Figs. 15 and 16, the forces which make the return stroke are within limits independent of the length of the discharge stroke of the pump 3. There is provided, therefore, a simple and expeditious control of the rate of pumping so that full production of the well may be realized without undue waste of power or excessive wear on the operating mechanism.

It is undesirable to run the pump at a rate in excess of the production of the well since that would result merely in the pumping of undesired fluids and might in the case of considerable air or other gas interfere with the operation of the system.

I do not intend to be limited to the details shown and described, except as they are recited in the appended claims.

I claim:

1. In a device of the class described, the combination of a power column and a discharge column in hydrostatic balance, a pump device having a moving motor piston disposed in substantially hydrostatic balance between the columns and having a pumping piston connected to the motor piston and disposed between the discharge column and the outside of the device for moving liquid from the well into the discharge column, and a balancing piston between the outside of the pumping device and the discharge column for balancing the pumping piston hydrostatically.

2. In a device of the class described, the combination of a power column and a discharge column in substantially hydrostatic balance, a pump device having a moving motor piston disposed between the columns and a pumping piston member in substantially hydrostatic balance between the inside and outside of the pump, means for depressing the power column to make a stroke of the pump device, and means for retaining an elastic back pressure upon the discharge column to make the return stroke of the pumping device.

3. In a device of the class described, the combination of a power column and a discharge column, a pump device actuated by oscillation of said columns for passing liquid from the well through one of said columns, said pump device comprising a piston system substantially in hydrostatic balance between the columns and between the inside and outside of the pump device, means for depressing the power column to make a stroke of the pump device, and means for retaining an elastic back pressure upon the discharge column to make a return stroke of the pump device.

4. In a device of the class described, a hydraulic power column, a hydraulic discharge column, a pump device comprising connected motor and pumping pistons arranged in substantially hydraulic balance between the columns and between the inside and the outside of the pump, and means for oscillating said columns alternately, said means including mechanism for retaining an elastic pressure at all times upon the discharge column.

5. In combination in a device of the class described a hydraulic discharge column, a hydraulic power column, pumping mechanism having a piston interposed in a state of substantial equilibrium between said columns, means for displacing the power column to make a discharge stroke of the pumping mechanism, said pumping mechanism having a power piston in substantial equilibrium between the inside and outside of the pumping mechanism, said pistons being connected, liquid in the well acting by submergent pressure upon said pumping mechanism to unbalance the pistons in a direction to assist in making the return stroke of the pistons.

6. In a device of the class described, a pair of hydraulic columns in substantially hydrostatic balance, a pumping device having a motor piston interposed in substantial equilibrium between said columns and having a pumping piston substantially in hydrostatic balance, a check valved inlet for liquid communicating on one side with the pumping piston and a closed end cylinder communicating on the other side of the pumping piston, the liquid in the well acting by submergence pressure upon said one side of the pumping piston to assist in making the filling stroke of the pumping device.

7. In a device of the class described, a pair of hydraulic columns in substantial hydrostatic balance, means for depressing one of the columns, a pumping device having a motor piston interposed in substantial equilibrium between said columns and having a pumping piston substantially in hydrostatic balance, a check valved inlet for liquid from the well communicating on one side with the pumping piston and a closed end cylinder communicating with the other side of the pumping piston and having a check valved outlet, the liquid in the well acting by submergence pressure upon said one side of the pumping piston to assist in making the filling stroke of the pumping device.

8. In a pump of the class described, a motor cylinder open at both ends, connections for hydraulic columns communicating with the ends of said cylinder, said cylinder having a counterbore at one end forming a checking chamber, a plunger in said cylinder projecting out of the end of the cylinder having the counterbore, a short stepped piston connected to the plunger and cooperating with said counterbore to form a liquid check, and work performing means connected to said plunger.

9. In a pump of the class described, a motor cylinder open at both ends, connections for hydraulic columns communicating with the ends of said cylinder, said cylinder having a counterbore at one end forming a checking chamber, a plunger in said cylinder projecting out of the cylinder through the counterbore, a crosshead connected to said plunger, said crosshead having a stepped piston adapted to enter said counterbore to check the motion of said plunger, said crosshead having a checking cylinder and a cooperating plunger carried by the crosshead and a spring for moving said checking plunger out of said checking cylinder.

10. In combination, in a pump, an outer casing having a passageway adapted to be connected to a hydraulic column, a motor cylinder open at its lower end into the casing, a passageway communicating with the upper end of said cylinder and adapted to be connected to a second hydraulic column, a plunger extending from below into said motor cylinder, said cylinder having a counterbore forming a checking cylinder said plunger having a stepped piston carried by the plunger and cooperating with said checking cylinder.

11. In combination, in a pump, an outer casing having a passageway adapted to be connected to a hydraulic column, a motor cylinder open at its lower end into the casing, a passageway communicating with the upper end of said cylinder and adapted to be connected to a second hydraulic column, a plunger extending from below into said motor cylinder, said cylinder having a counterbore forming a checking cylinder, said plunger having a stepped piston carried by the plunger and cooperating with said checking cylinder, a checking cylinder carried below said plunger, and a checking plunger carried by said motor plunger and cooperating with said latter checking cylinder.

12. In combination in a pump, an outer casing having a passageway adapted to be connected to a hydraulic column, a motor cylinder open at its lower end into the casing, a passageway communicating with the upper end of said cylinder and adapted to be connected to a second hydraulic column, a plunger extending from below into said motor cylinder, connecting rods connected to said motor plunger, and work performing means connected to said connecting rods, said rods comprising longitudinal sections of a cylindrical sleeve.

13. In a system of the class described, a pair of hydraulic columns, a pump adapted to be actuated by change of preponderance of pressure of said columns, one of said columns comprising a discharge column, a discharge pipe connected to said discharge column, a check valve in said pipe preventing outflow of liquid from the column, and a bypass about said check valve, said bypass including a spring loaded check valve permitting the discharge of liquid from said discharge column in excess of a predetermined pressure.

14. In a system of the class described, a pair of hydraulic columns, a pump adapted to be actuated by change of preponderance of pressure of said columns, one of said columns constituting a discharge column, a discharge pipe connected to said discharge column, a check valve in said pipe preventing outflow of liquid from the column, a bypass about said check valve, said bypass including a spring loaded check valve permitting the discharge of liquid from said discharge column in excess of a predetermined pressure, and a pneumatic pressure chamber communicating with said discharge column.

15. In combination, a pair of hydraulic columns, a pump adapted to be actuated by change of preponderance of pressure of said columns, one of said columns being a discharge column for liquid from said pump, a discharge pipe for said discharge column, a loaded discharge check valve for said pipe for retaining a predetermined pressure upon said discharge column, a bypass for said loaded check valve including a check valve opening towards the discharge column, and a pressure chamber communicating with the discharge column.

16. In combination, a pair of hydraulic columns, a pump adapted to be actuated by oscillations of said columns, one of said columns being a discharge column for liquid from said pump, a discharge pipe for said discharge column, a loaded discharge check valve for said pipe for retaining a predetermined pressure upon said discharge column, a bypass for said loaded check valve including a check valve opening towards the discharge column, a pressure chamber communicating with the discharge column, and a jack for applying pressure periodically to the other of said columns to cause the pump to make a discharge stroke and discharge liquid into the discharge column.

17. In combination, a pair of hydraulic columns, a pump adapted to be actuated by oscillations of said columns, one of said columns being a discharge column for liquid from said pump, a discharge pipe for said discharge column, a loaded discharge check valve for said pipe for retaining a predetermined pressure upon said discharge column, a bypass for said loaded check valve including a check valve opening towards the discharge column, and a pressure chamber communicating with the discharge column, a jack having a power cylinder and plunger for applying pressure periodically to the other of said columns to cause the pump to make a discharge stroke and discharge liquid into the discharge column, said jack having a cylinder communicating with the discharge pipe, a piston for said latter cylinder, a valve for said latter cylinder, said valve being open throughout the major part of each stroke of the latter piston.

18. A jack having a pair of cylinders, a pair of plungers therefor, common means for driving said plungers, a pair of hydraulic columns connected to said cylinders, a pump connected to said columns and actuated by at least one of said columns, valves controlling the escape of liquid from said cylinders, and adjustable control means for said valves for controlling the valves independently for each stroke of each plunger.

19. In combination, a pair of hydraulic columns comprising a power column and a discharge column, said discharge column having greater elasticity than the power column, a pump adapted to be actuated by action of said column to discharge liquid into the discharge column, a jack comprising a pair of cylinders, pistons for said cylinders, said cylinders being in communication with said column, means between the jack discharge cylinder and the discharge column for retaining fluid under predetermined pressure, and valve means for said cylinders for controlling the effective stroke of the plungers in the cylinders, and independently adjustable means for controlling the opening and closing of said valves for each stroke of each piston in its cylinder.

20. In combination, a pair of hydraulic columns comprising a power column and a discharge column, said discharge column having greater elasticity than the power column, a pump adapted to be actuated by the action of said columns to discharge liquid from the well into the discharge column, a jack comprising a pair of cylinders, pistons for said cylinders, said cylinders being in communication with said columns, means between the jack discharge cylinder and the discharge column for retaining fluid under predetermined pressure, and valve means for said cylinders for controlling the effective stroke of the plungers in the cylinders.

21. In a jack, the combination of a frame, a pair of alined cylinders on the frame, a pair of cooperating pistons for said cylinders, valves for said cylinders for controlling the effect of said pistons, means for simultaneously actuating said pistons, a cam plate connected to said pistons, adjustable cams on said plate, and followers for said cams, said followers being connected to said valves to actuate the same.

22. In a jack, a frame, alined cylinders on said frame, alined plungers for said cylinders, a crosshead for said plungers, a cam plate carried by said crosshead, cam strips on said plate, followers for said cam strips, and stroke control valves for said cylinders actuated by said cam followers under the action of said cam strips.

23. In a jack, a frame, alined cylinders on said frame, alined plungers for said cylinders, a crosshead for said plungers, a cam plate carried by said crosshead, cam strips on said plate, followers for said cam strips, stroke control valves for said cylinders actuated by said cam followers under the action of said cam strips, said cam strips comprising two strips for each cylinder and a pair of rollers for each follower, said rollers of each follower knuckling in opposite directions.

24. In combination, a frame, a pair of alined cylinders on the frame, a pair of connected plungers for said cylinders, a cam plate connected to said plungers, hydraulic pumping columns connected to said cylinders, control valves comprising poppet valves feeding with pressure for said cylinders, relatively stationary cam followers for actuating said valves, and volume tanks connected to the cylinders through said control valves.

25. In combination, a jack cylinder having a valve, a plunger for the cylinder, means to operate the plunger, a cam plate carried by the plunger, said cam plate having adjustable cam strips, and a relatively stationary cam follower for operating said valve, said follower having a swinging roller.

26. In combination, a jack cylinder having a valve, a plunger for the cylinder, means to operate the plunger, a cam plate carried by the plunger, said cam plate having adjustable cam strips, a relatively stationary cam follower for operating said valve, said follower having a pair of rollers, one of said rollers knuckling in one direction, one of said cam strips being slightly higher than the other to permit said swinging roller to knuckle out when the motion of the plate reverses and the other roller cooperating with the lower cam strips to hold the control valve open.

27. In combination, in a system of the class described, a power column and a discharge column, the discharge column containing gas rendering the same relatively elastic, a pump having a motor piston disposed between the lower ends of the columns and having liquid pumping means actuated by a power stroke of the motor for discharging liquid from the well into the discharge column, means for depressing the power column to make a power stroke of said motor piston, and means for retaining a false head on the discharge column for substantially balancing the pressure of the columns on said motor piston.

28. The method of balancing a gas containing discharge column against a relatively gas free power column in a pumping apparatus wherein the two columns are reciprocated to reciprocate a pump, which method comprises, retaining a false pneumatic head upon said discharge column preventing the discharge of liquid from the discharge column at a pressure less than the false pneumatic head, and permitting the discharge of liquid from said discharge column at pressure in excess of said false pneumatic head.

29. In a system of the class described employing a pair of hydraulic columns, the method of quieting the discharge of liquid and gas from one of said columns which comprises retaining the said column under a false pressure head.

30. In combination, a pair of hydraulic columns extending into a well, a jack having a cylinder connected to the head of one of said columns, a pump in the well disposed between said columns and actuated by depression of one of the columns by the jack, and a pressure retaining device for maintaining the other column under a false head.

31. The method of reducing loss of power by hysteresis in a hydraulic pump having a hydraulic transmission column which consists in maintaining a part of said column under continuous false head substantially in excess of the working pressure applied thereto.

32. In combination with a hydraulic pump having a power column, a jack for applying impulses of pressure to said column, an extension of said column terminating in a cylinder, a piston in said cylinder, and a second piston of larger diameter attached to said first piston, said second piston working in a closed air filled cylinder to cushion said column against shocks from said jack.

33. In combination with a hydraulic pump having a power column, a jack for applying impulses of pressure to said column, an extension of said column terminating in a cylinder, a piston in said cylinder, a second and larger diameter cylinder having an open end communicating with said first cylinder and having the other end closed, a check valve communicating with said closed end, said valve being set to permit the flow of air into the cylinder and to check the flow of air from the cylinder, and a second piston disposed in said larger cylinder and connected to and moved by said first piston to cushion said column against shocks from said jack.

34. In a pumping system having a pair of hydraulic columns and a pump operated by alternate preponderance of pressure in said columns, the method of reducing loss by expansion and contraction of the columns which comprises maintaining one of said columns under continuous pressure in excess of the operating pressure applied thereto.

35. In a pumping system having a pair of hydraulic columns and a pump operated by said columns, the method of reducing the expansion and contraction of one of said columns which consists in maintaining it continuously under a false head.

36. In a system of the class described employing a pair of hydraulic columns and a pump operated thereby, said columns comprising a discharge column into which the pump discharges and another column, the method which comprises actuating the pump to make a discharge stroke by motion of translation of the other column and making the return stroke by expansion of the discharge column.

37. In a system of the class described employing a pair of hydraulic columns and a reciprocating pump operated thereby, the method which comprises moving the pump piston to make a discharge stroke by motion of translation downward of one of the columns, discharging liquid and gas by said motion of the pump into the other column, retaining said gas and liquid under a pressure in excess of the hydrostatic head of liquid in the latter column and allowing expansion of said gas to raise the first column and make the return stroke of the pump.

38. In a pumping system comprising a pair of columns in substantial equilibrium and extending into a well with a pumping device interposed between them, the method of causing strokes of the pumping mechanism which comprises pressing one of the columns downward, by said downward motion producing a stroke of the mechanism driving liquid from the well into the other column, releasing downward pressure on said first column, applying submergent pressure of liquid in the well to produce an unbalance of the two columns and by said unbalance of pressure making the return stroke of the pump mechanism.

39. In a pumping system comprising a pair of columns in substantial equilibrium with a pumping device interposed between them, the method of causing strokes of the pumping device which comprises pressing one of the columns downward, by said downward motion producing a stroke of the mechanism driving liquid from the well into the other column, releasing downward pressure on said first column, applying a false head to said other column to unbalance said column, and by said unbalance making the return stroke of the pump mechanism.

40. In a pumping system comprising a pair of columns in substantial equilibrium and extending into a well with a pumping device interposed between them, the method of causing strokes of the pumping device which comprises pressing one of the columns downward, by said downward motion producing a stroke of the mechanism driving liquid and gas from the well into the other column, retaining said gas under a false head in said other column, releasing downward pressure upon said first column and permitting the expansion of the gas in said other column to make the return stroke of the pump mechanism.

41. In a pumping apparatus the combination with two hydraulic columns in substantial equilibrium and extending into a well, of a pump disposed in the liquid in the well and interposed between said columns, means in the pump actuated by depression of one of the columns for discharging liquid taken from the well into the other column and means in the pump actuated by submergent pressure for making the intake stroke of the pump.

42. In a pumping apparatus the combination with two hydraulic columns in substantial equilibrium and extending into a well, of pumping mechanism disposed in the liquid in the well and having a motor piston interposed between said columns, means in the pumping mechanism actuated by movement of said piston by depression of one column to force liquid drawn from the well into the other column, means for maintaining a pneumatic pressure upon said other column, means permitting escape of fluid in excess of said pressure from said other column and means in the pumping mechanism subject to the pneumatic pressure on said other column for making the return stroke of the pump.

43. In a pumping apparatus the combination with two hydraulic columns in substantial equilibrium and extending into a well of pumping mechanism disposed in the liquid in the well and having a motor piston interposed between said columns, means in the pumping mechanism actuated by movement of said piston by depression of one column to force liquid drawn from the well into the other column and means in the pumping mechanism subject to submergent pressure of liquid in the well for making the return stroke of the pumping mechanism.

44. In combination a pair of hydraulic columns extending into a well, a jack having a cylinder connected to the head of one of said columns for oscillating said columns, a pump in the well disposed between said columns and actuated by depression of one of the columns by the jack to make a stroke, a pressure retaining device for maintaining the other column under a false head, and means in the pump acted upon by the false head to operate the pump to make a return stroke.

45. In combination a pair of hydraulic columns comprising a power column and a discharge column, said columns extending into a well, a jack having a cylinder connected to said power column and a plunger for said cylinder, a stroke control valve for said jack cylinder, a pressure retaining valve on the discharge column for maintaining the column under a false head, a pump in the well having a piston between said columns, said pump being adapted to introduce liquid from the well into the discharge column, said discharge column having sufficient gas held under pressure by said retaining valve to cause the pump to make a stroke as soon as pressure upon the power column is released.

46. In combination a pair of reciprocating hydraulic columns, a pump disposed between the foot of said columns, a jack having a cylinder connected to one of said columns for moving it in one direction and a pressure chamber connected to the other of said columns for actuating said pump and effecting the reverse movement of said one column.

47. In a pumping system the combination of a pair of hydraulic columns with a pump having a motor piston disposed in substantially hydrostatic balance between said columns, a pumping cylinder and piston and a balancing cylinder and piston in communication with one of said columns, said pistons being all connected and being correlated to maintain them in substantial hydrostatic balance with respect to the hydrostatic pressure of the two columns, and means for holding a false head upon the said one column to provide an upwardly acting unbalancing force upon said connected pistons.

48. In a pumping system the combination of a pair of hydraulic columns with a pump having a motor piston disposed in substantially hydrostatic balance between said columns, a pumping cylinder and piston and a balancing cylinder and piston in communication with one of said columns, said pistons being interconnected and being correlated to maintain them in substantial hydrostatic balance with respect to the hydrostatic pressure of the two columns, said one column having gas admitted thereinto during pumping and means for holding a false head of gas upon said one column sufficient to make up for the difference in gravity of the two columns.

49. In combination a pair of hydraulic columns, a pump disposed between said columns at their foot, a jack connected to one of said columns for producing discharge strokes of the pump, and means at the head of said columns for maintaining a difference in pressure upon the heads of the columns.

50. In combination a pair of hydraulic columns, a pump disposed between and operatively connected to said columns at their foot, a jack connected to one of said columns for producing downward motion of one of said columns, to make one stroke of the pump, and means independent of the jack for making the return strokes of the pump, said means including a closed end balancing cylinder and pistons in the pump.

51. The method of raising liquid having a gas content from a well which comprises establishing a column of the liquid, establishing an operating column of liquid, separating said columns by a movable member, depressing the operating column and thereby injecting a quantity of gas containing liquid into the foot of the column to cause upward drift of the liquid in the first column, by said upward drift releasing the hydrostatic pressure upon a particle of gas in said column, by said release of pressure permitting expansion of the particle of gas, by said expansion raising liquid in the first column to assist in the work of raising liquid to the head of the well, trapping the gas under pressure at the head of the well to exert a back pressure upon the said first column and by expansion of said trapped gas driving the movable member in a reverse direction to raise the second column.

52. In a deep well pump having a liquid power column and a liquid discharge column and of the type wherein operation is obtained by reciprocating the two columns and imparting an upward drift to the discharge column, the method of reciprocating said columns which comprises exerting a pressure upon the power column at the top thereof to cause a downward movement of that column and an upward movement of the discharge column, by the movement of the discharge column creating a false head in said discharge column, then releasing the excess pressure at the top of the power column and causing said false head to move the discharge column down and the power column up.

53. In a deep well pump having a liquid power column and a liquid discharge column and of the type wherein operation is obtained by reciprocating the two columns and imparting an upward drift to the discharge column, the method of reciprocating said columns which comprises balancing said columns, then disturbing said balance by exerting a pressure upon the power column at the top thereof to cause a downward movement of that column and an upward movement of the discharge column, by the movement of the discharge column creating a false head in said discharge column, then releasing the excess pressure at the top of the power column and causing said false head to move the discharge column down and the power column up to again bring said columns into balance.

WILBUR N. SQUIRES.